United States Patent
Jasklowski et al.

(10) Patent No.: US 9,021,813 B2
(45) Date of Patent: May 5, 2015

(54) CABLE-ACTUATED VARIABLE AREA FAN NOZZLE WITH ELASTOMERIC SEALS

(75) Inventors: Christopher Jasklowski, Redmond, WA (US); Michael L. Sangwin, Lake Stevens, WA (US); David William Foutch, Seattle, WA (US); Mehmet Bahadir Alkislar, Bellevue, WA (US); Matthew Anthony Dilligan, Seattle, WA (US)

(73) Assignee: The Boeing Company, Chicagi, IL (US)

( * ) Notice: Subject to any disclaimer, the term of this patent is extended or adjusted under 35 U.S.C. 154(b) by 824 days.

(21) Appl. No.: 13/225,803

(22) Filed: Sep. 6, 2011

(65) Prior Publication Data

US 2013/0020408 A1   Jan. 24, 2013

(51) Int. Cl.
| | | |
|---|---|---|
| F02K 1/12 | (2006.01) |
| F02K 1/11 | (2006.01) |
| B25J 5/00 | (2006.01) |
| B62D 57/024 | (2006.01) |
| G05D 1/00 | (2006.01) |
| B64F 5/00 | (2006.01) |

(52) U.S. Cl.
CPC ............... *B25J 5/007* (2013.01); *B62D 57/024* (2013.01); *G05D 1/0033* (2013.01); *B64F 5/0018* (2013.01)

(58) Field of Classification Search
CPC ....... F02C 7/28; F05D 2300/501; F02K 1/12; F02K 1/1207; F02K 1/123; F02K 1/54; F02K 1/1261; F02K 1/805
USPC ............. 60/226.2, 226.3, 232, 242, 770, 771; 239/265.19, 265.33, 265.37, 265.39, 239/265.43
See application file for complete search history.

(56) References Cited

U.S. PATENT DOCUMENTS

| | | | |
|---|---|---|---|
| 2,634,578 A * | 4/1953 | Kallal | ............ 239/265.39 |
| 3,612,398 A | 10/1971 | Timms | |
| 3,892,358 A * | 7/1975 | Gisslen | ............ 239/265.39 |
| 4,049,199 A | 9/1977 | Nightingale | |

(Continued)

FOREIGN PATENT DOCUMENTS

WO   2008/045034 A1   4/2008

OTHER PUBLICATIONS

Search Report and Opinion from European Patent Application No. EP 12183400, European counterpart to U.S. Appl. No. 13/225,803, report dated Jan. 23, 2013.

(Continued)

*Primary Examiner* — Andrew Nguyen
(74) *Attorney, Agent, or Firm* — Ostrager Chong Flaherty & Broitman P.C.

(57) ABSTRACT

An apparatus installed on an aircraft, comprising: a sleeve or duct having a trailing lip area; a plurality of petals arranged side by side with gaps therebetween, one end of each petal being attached or pivotably coupled to the lip area; and a plurality of elastomeric seals configured and disposed to close the gaps between adjacent petals. Each elastomeric seal comprises a first portion that moves with a portion of a first petal that is in contact therewith, a second portion that moves with a portion of a second petal that is in contact there, and a third portion which is stretched as the first and second petals move further apart from each other. Petal deflection is actuated by a system comprising a flexible member, a motor, a shaft driven by the motor, and an arm projecting from the shaft. One end of the flexible member is attached to the arm, the flexible member being movable to deflect the petals inward in response to a shaft rotation.

20 Claims, 10 Drawing Sheets

(56) References Cited

U.S. PATENT DOCUMENTS

| | | | |
|---|---|---|---|
| 4,196,856 A | 4/1980 | James | |
| 4,994,660 A | 2/1991 | Hauer | |
| 5,034,172 A | 7/1991 | Vives | |
| 5,806,302 A | 9/1998 | Cariola et al. | |
| 6,983,588 B2 | 1/2006 | Lair | |
| 7,458,221 B1 * | 12/2008 | Arnold et al. | 60/771 |
| 7,528,356 B2 * | 5/2009 | Martinez | 250/231.13 |
| 7,721,549 B2 | 5/2010 | Baran | |
| 7,797,944 B2 | 9/2010 | Morford et al. | |
| 2008/0302907 A1 * | 12/2008 | Schafer | 244/54 |
| 2009/0097967 A1 | 4/2009 | Smith et al. | |
| 2009/0226303 A1 | 9/2009 | Grabowski et al. | |
| 2010/0018212 A1 | 1/2010 | Core | |
| 2010/0115958 A1 | 5/2010 | Parham | |
| 2010/0229527 A1 | 9/2010 | Amkraut et al. | |
| 2011/0030338 A1 * | 2/2011 | Vauchel | 60/226.2 |

OTHER PUBLICATIONS

European Examination Report dated Feb. 3, 2015, European Patent Application No. EP 12183400.6, European counterpart to the instant patent application.

* cited by examiner

CABLE-ACTUATED VARIABLE AREA FAN NOZZLE WITH ELASTOMERIC SEALS

BACKGROUND

The present disclosure relates generally to turbofan engines and, more particularly, to turbofan engines having a variable area fan nozzle.

Aircraft noise pollution is a significant environmental problem for communities near airports. Jet engine exhaust accounts for a majority of the noise produced by engine-powered aircraft during takeoff. Because it occurs at a relatively low frequency, jet engine exhaust noise is not effectively damped by the atmosphere alone.

Bypass turbofan engines typically produce two exhaust stream components: the engine core flow and the fan flow. The engine core flow is discharged from a core flow nozzle after passing through a core engine. The fan flow passes through an annular passageway formed by a core engine nacelle which surrounds the core engine and a fan duct which surrounds at least a portion of the core engine nacelle. An outlet for the fan duct is defined intermediate the core nacelle and a variable area fan nozzle. In some implementations, the variable area fan nozzle is secured to the downstream end of an axially translatable thrust reverser sleeve, which forms a part of the fan duct. The fan flow exits this outlet. The engine and fan flows collectively produce thrust that propels the aircraft forward.

In bypass turbofan engines, the engine core flow throat area at the core flow nozzle and the fan flow throat area at the fan nozzle are preferably optimized for specific engine operating conditions. For example, during takeoff, a relatively high level of thrust is required from the engines as compared to lower levels of thrust that are required during cruise flight. Increasing the quantity or mass of airflow through the fan duct having a fixed throat area at the fan nozzle results in an increase in the velocity of the airflow. An increase in the nozzle exit velocity results in an increase in the amount of noise that is generated by the nozzle.

One approach to increasing the fan nozzle throat area as a means to reduce noise generated during high-thrust events such as during takeoff is through the use of movable flaps or petals which form the fan nozzle exit external boundary. The flaps or petals may be deflected outwardly to enlarge the throat area of the fan nozzle and thereby reduce the exhaust velocity or, conversely, they may be deflected inwardly to reduce the throat area of the fan nozzle and thereby increase the exhaust velocity. The flaps or panels may also be biased to one side or the other in order to provide thrust vectoring for increased maneuverability of the aircraft.

It is known to vary the area of the fan nozzle (thereby modulating the fan flow) by deflecting flaps or panels (hereinafter "petals") attached to the trailing lip area of an axially translatable thrust reverser sleeve which exposes cascades that redirect the fan flow forward. As used herein (including in the claims), the term "thrust reverser sleeve" includes at least the following configurations: (1) a one-piece axially translatable sleeve that extends around a major portion of the circumference of the fan duct, from one side of the engine pylon to the other; and (2) two axially translatable half-cowls mounted on rails fixed to upper and lower beams and extending from the upper beam to the lower beam. In accordance with the latter configuration, the upper beam is the main hinge beam that allows the reverser to open for engine access and removal. The lower beam (referred to hereinafter as "latch beam") provides a means for locking together the two half-cowls. Thus the second configuration typically has two upper hinge beams and two latch beams.

In accordance with above-described configurations, a lack of fan nozzle throat position control can lead to petal flutter. Also, leakage of high-pressure fan flow radially outward between the petals of the variable area fan nozzle can degrade engine performance. There exists a need in the art for improved variable area fan nozzle systems designed to control fan nozzle throat location and prevent air leakage radially outward through the fan nozzle.

SUMMARY

The embodiments disclosed hereinafter generally relate to systems and methods for modulating fan flow in a turbofan engine by varying the exit or throat area of a nozzle at the trailing edge of a fan duct or thrust reverser sleeve. Such systems will be referred to herein as variable area fan nozzles.

In accordance with some embodiments, the variable area fan nozzle comprises an array of elastically deformable petals attached to a lip area at the downstream end of a thrust reverser sleeve. In accordance with other embodiments, pivotable rigid petals can be substituted for elastically deformable petals. In either case, petal deflection can be actuated using one or more cables which extend around a major portion of the fan nozzle circumference. In the case of multiple cables, those cables are axially spaced from each other and are in contact with respective portions of each petal in the petal array. An actuation system controls the deformation or deflection of the petals, thereby controlling the amount of opening and the rate at which the fan nozzle throat area changes. Alternatively, the cables can be replaced with rods, tubes or bands made of composite material.

Whether the petals are flexible or rigid, elastomeric seals are placed in the gaps between adjacent petals, preventing the escape of engine exhaust radially outward through the fan nozzle. The seals may be made of silicone rubber or other suitable elastomeric material. Portions of these elastomeric seals are clamped between inner and outer face sheets of adjacent petals. The petals can be deflected inwardly or outwardly between outer and inner limit positions, thereby respectively reducing or increasing the fan nozzle exit area. When adjacent petals are at or near their inner limit positions, the intervening elastomeric seal is in an unstretched (i.e., nominal) state. In contrast, when adjacent petals are at their outer limit positions, the intervening elastomeric seal is in a stretched state. The elastomeric seals, together with the petals, provide a continuous flow surface and prevent air leaking from the fan pressure side of the fan nozzle to the ambient pressure side, thereby improving engine performance.

In the embodiments disclosed hereinafter, an actuation system controls the amount of opening of the fan nozzle exit area and the rate of change of that exit area. The actuation system incorporates one or more cables which extend around a major portion of the fan nozzle circumference. Composite (e.g., fiber-reinforced plastic) rods, tubes or bands can be substituted for cables. Cable position and displacement is controlled by a motor-driven rotary actuator having a shaft-mounted arm attached to one end of the cable. Alternatively, both ends of the cable can be attached to respective actuators. Moreover, in cases where flexible petals are used, it is advantageous to provide two axially spaced cables. In that event, the actuation system further comprises two concentric actuator shafts having arms mounted on their respective ends for independently controlling the respective positions and/or displacements of the cables. The axis of rotation and length of the actuator arms can be selected such that end petals (at the split line of the thrust reverser sleeve) deflect the same amount as petals in the middle of the thrust reverser sleeve. The fan nozzle exit area may be adjusted to under-area (compared to nominal area at cruise), which benefits fuel consumption during certain segments of flight mission, or to over-area, contributing to noise reduction and improving fan operability.

In embodiments having elastically deformable petals, each petal comprises inner and outer face sheets made of a flexible composite material such as fiber-reinforced plastic. One end of each face sheet is fastened or attached to the downstream lip area of the thrust reverser sleeve. The flexible petals achieve a required aerodynamic shape as a result of at least three factors: the air pressure in the fan duct, the stiffness of the panel (which stiffness varies along the length of the petal) and input from the actuation system. The cable actuation system disclosed herein enables variable deflection along the petal length. An increase in the fan nozzle exit area can be realized by a combination of fan duct air pressure and panel pre-stressed shape when the cables are released and no longer restrain outward petal deflection.

One aspect of the invention is an apparatus installed on an aircraft, comprising: a sleeve or duct having a trailing lip area; a plurality of petals arranged side by side with gaps between adjacent petals, one end of each petal being attached or pivotably coupled to the lip area; and a plurality of elastomeric seals configured and disposed to close the gaps between adjacent petals, wherein at least one of the elastomeric seals comprises a first portion that moves with a portion of a first petal that is in contact with the first portion, a second portion that moves with a portion of a second petal that is in contact with the second portion, and a third portion which is stretched as the first and second petals move further apart from each other.

Another aspect of the invention is an apparatus installed on an aircraft, comprising: a sleeve or duct having a trailing lip area; a plurality of petals arranged side by side with gaps between adjacent petals, one end of each petal being attached or pivotably coupled to the lip area, wherein each petal comprises respective inner and outer face sheets that confront each other with space therebetween; a plurality of elastomeric seals configured and disposed to close the gaps between adjacent petals; and an actuation system comprising a flexible member that passes through the spaces between the inner and outer face sheets and is movable to deflect the petals inward.

A further aspect of the invention is an apparatus installed on an aircraft, comprising: a sleeve or duct having a trailing lip area; a plurality of petals arranged side by side with gaps between adjacent petals, one end of each petal being attached or pivotably coupled to the lip area, wherein each petal comprises respective inner and outer face sheets that confront each other with space therebetween; and a plurality of elastomeric seals configured and disposed to close the gaps between adjacent petals, wherein at least one of the plurality of elastomeric seals comprises a first portion that projects into a first space between opposing edges of the outer face sheets of adjacent first and second petals, a second portion that projects into a second space between opposing edges of the inner face sheets of the first and second petals, a third portion that projects into a third space between confronting portions of the inner and outer face sheets of the first petal, and a fourth portion that projects into a fourth space between confronting portions of the inner and outer face sheets of the second petal.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments will now be described as applied to the thrust reverser sleeve of a turbofan aircraft engine. However, the variable area fan nozzle systems disclosed also have application to the trailing lip area of fan ducts which do not incorporate a thrust reverser sleeve.

Figure 1:
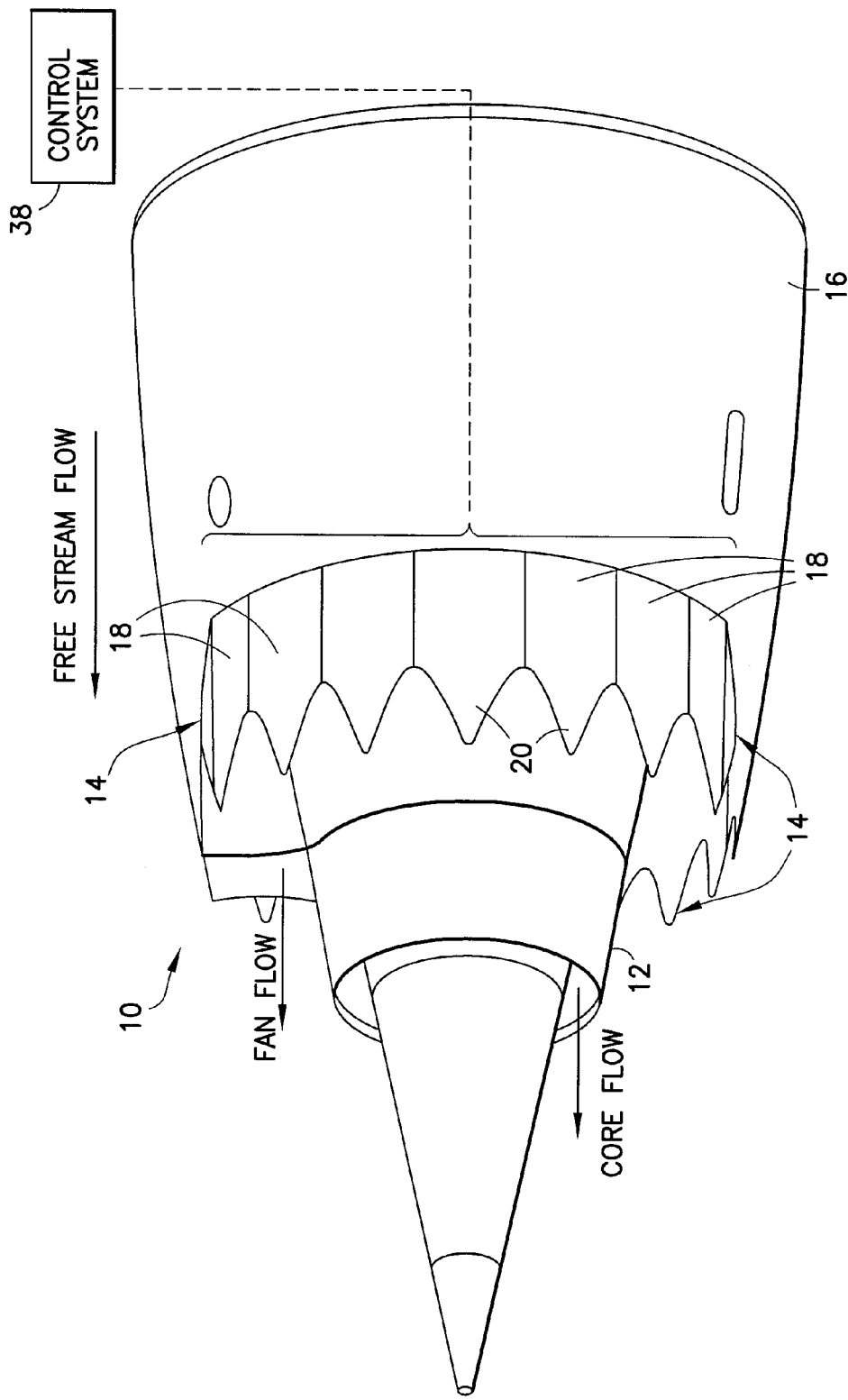
FIG. 1 is a diagram showing an isometric view of an aircraft turbofan engine having a variable area fan nozzle attached to a cowl or to two half-cowls of a thrust reverser (both structures being hereinafter referred to by the term "thrust reverser sleeve) in accordance with various embodiments.

FIG. 1 shows a side view of a turbofan engine 10 for an aircraft. A core engine nacelle surrounds the core engine (not shown). The turbofan engine 10 provides thrust from both a core flow of engine exhaust exiting a core flow nozzle 12 that forms a downstream end of the core engine nacelle, and a fan flow exiting from a variable area fan nozzle 14 mounted (e.g., bolted) to the downstream end or lip area of a thrust reverser sleeve 16. The sleeve 16 overlaps at least a portion of the core engine nacelle. The core flow generally has a higher velocity than the fan flow.

In accordance with one embodiment, the variable area fan nozzle 14 comprises a multiplicity of elastically deformable or pivotable rigid petals 18 which are configured to alter the fan flow passing through the fan duct when the petals are deflected inward or outward. The petals 18 are disposed side by side along a trailing lip of the thrust reverser sleeve 16. On the one hand, if the thrust reverser sleeve is a one-piece axially translatable sleeve, then the petal array extends around a major portion of the circumference of the fan duct, from one side of the engine pylon to the other. On the other hand, if the thrust reverser sleeve comprises two axially translatable half-cowls mounted on rails fixed to upper and lower beams, then the petal array consists of two sets of petals attached to the respective half-cowls, each petal set extending from the respective upper beam to the respective lower beam on a respective side of the engine.

Optionally, the petals 18 may have chevrons 20 attached to the distal ends thereof. In accordance with one embodiment wherein the petals are flexible and have one end fastened to the lip area (e.g., by rivets or bolts), the petals are pre-stressed such that in an undeflected state, they extend outwardly, which state is suitable for reducing noise during takeoff, approach and landing. A control system 38 is configured to control an actuation system (not shown in FIG. 1) which deflects the petals 18 inward from their nominal positions during cruise flight conditions to maximize fuel efficiency. When the actuation system is de-activated, the petals return to their pre-stressed state.

Figure 2:
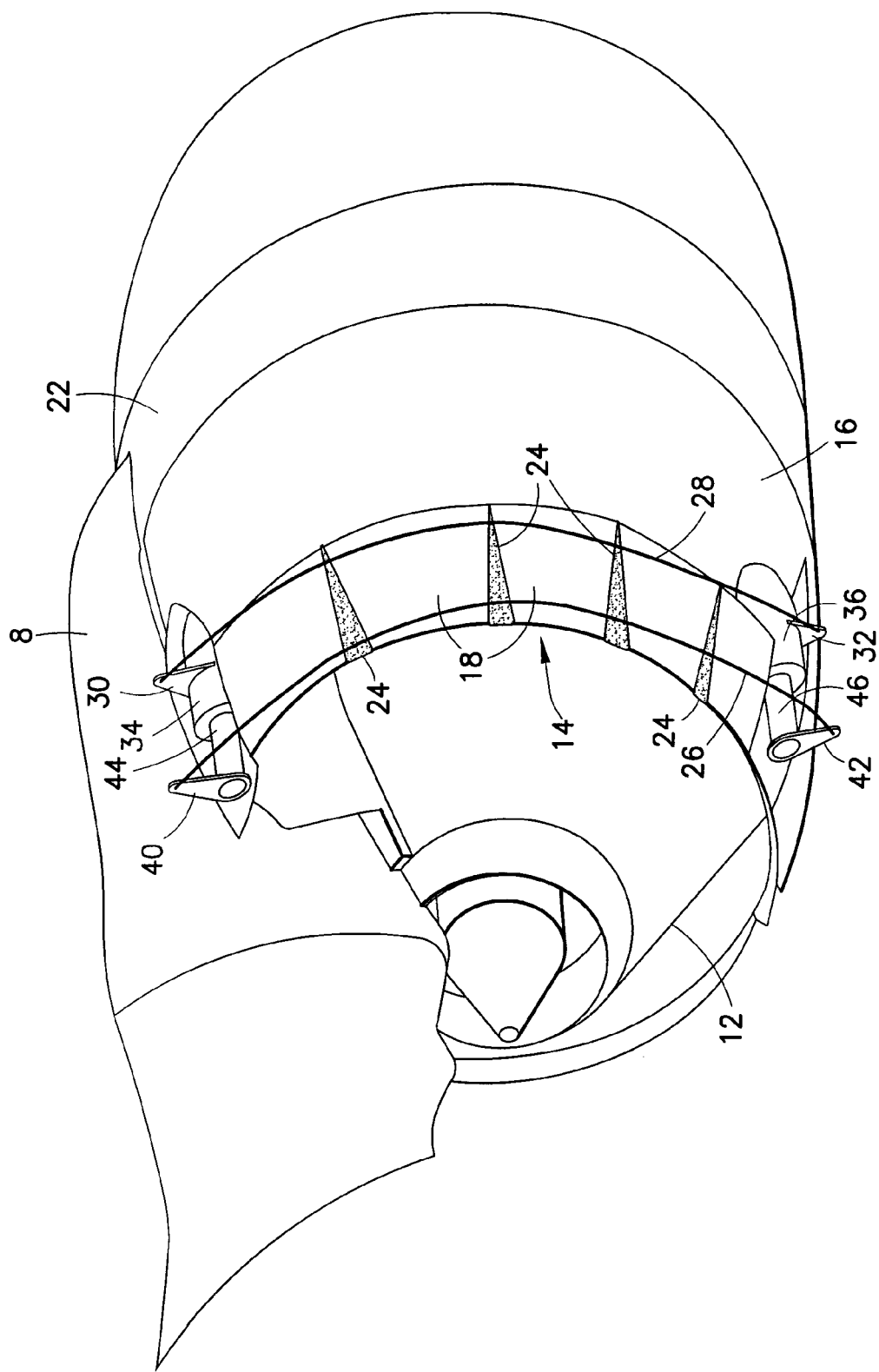
FIG. 2 is a diagram showing an isometric view of an aircraft turbofan engine having a cable-actuated variable area fan nozzle attached to a thrust reverser sleeve, the actuation system having two axially separated cables.

An actuation system in accordance with one embodiment is partly depicted in FIG. 2, which shows a turbofan engine mounted on an engine pylon 8 and having a fan duct 22, a thrust reverser sleeve 16 and a variable area fan nozzle 14 at the trailing lip of sleeve 16. The variable area fan nozzle 14 comprises two sets of elastically deformable petals 18 arranged on opposite sides of engine pylon 8. Only one set of petals is visible in FIG. 2. For each set of petals, adjacent petals 18 are separated by a triangular or trapezoidal gap or space, each such gap being occupied by a respective elastomeric seal 24. These seal may be made of silicone rubber or other suitable elastomeric material. The elastomeric seals 24 prevent leakage of air from inside to outside of the variable area fan nozzle 14 through the petal arrays. The shape of the inter-petal gap does not change, but the triangle or trapezoid gets narrower as the petals deflect inward. The elastomeric seal returns from a stretched condition to nominal condition during inward petal deflection.

In the embodiment depicted in FIG. 2, inward deflection of the petals 18 on each side of the engine is actuated by a system comprising respective pairs of cables 26 and 28 (only one pair is visible in FIG. 2) which are disposed generally circumferentially at respective axial positions. As will be described in more detail below, each petal comprises overlapping inner and outer face sheets having a space therebetween, and the cables 26 and 28 pass between the inner and outer face sheets of the petals 18 and also pass through the elastomeric seals. However, to avoid undue complexity in this drawing, the cables 26, 28 have been drawn as if fully visible from one end to the other, when in fact the major portion of each cable is covered by the outer sheets of the petals 18 and by the elastomeric seals 24.

Still referring to FIG. 2, the ends of cable 28 are attached to the ends of respective arms 30, 32, which are respectively mounted to shafts 34, 36. Similarly, the ends of cable 26 are attached to the ends of respective arms 40, 42, which are respectively mounted to shafts 44, 46. In this embodiment, the pairs of concentric shafts are respectively located adjacent to the hinge and latch beams (not shown) that support the thrust reverser sleeve. The components of the actuation system which drives rotation of shafts 34, 36 and 44, 46 will be described later with reference to FIGS. 9-11.

Figure 3:
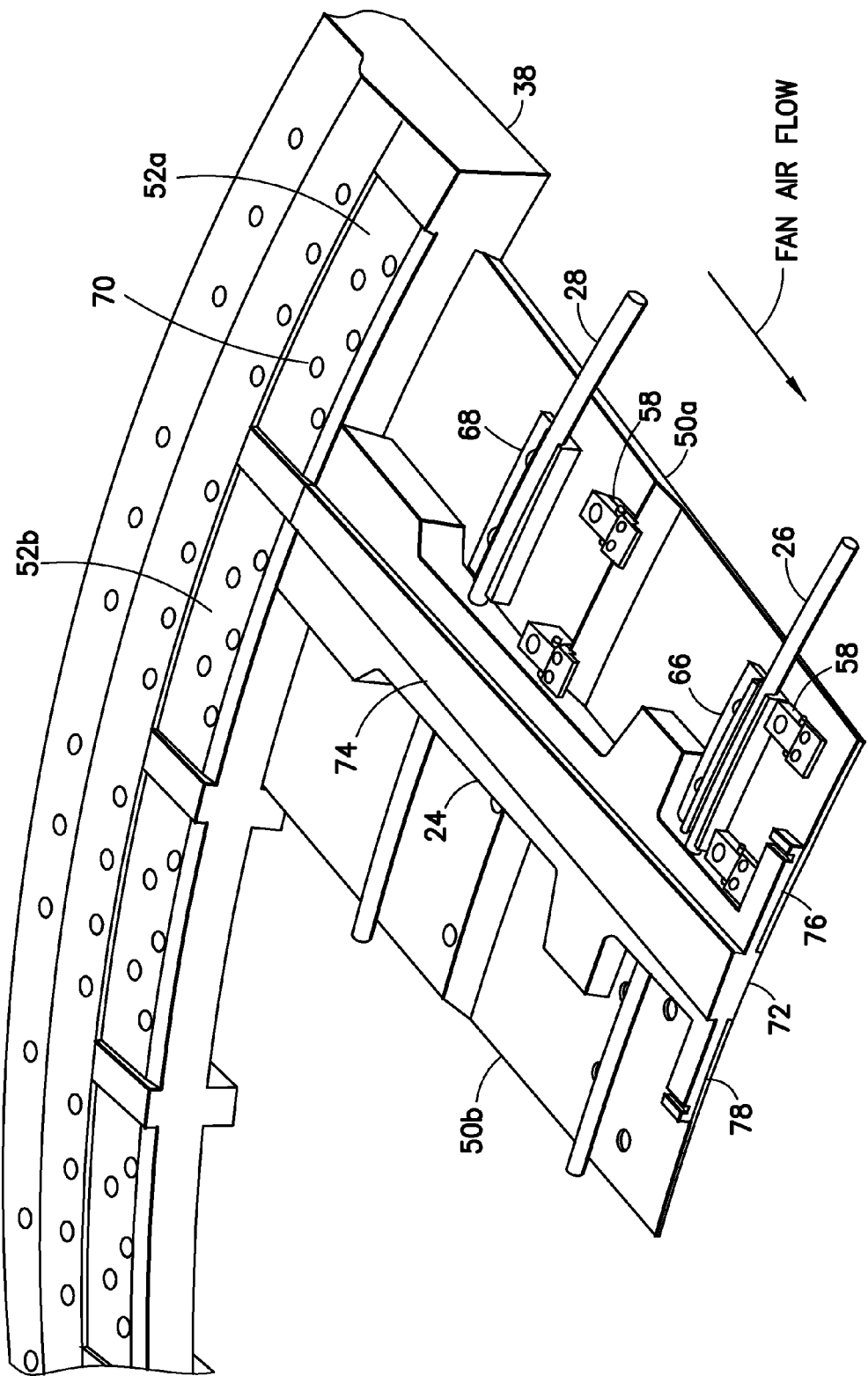
FIG. 3 is a diagram showing an isometric view of two inner face sheets (of adjacent variable area fan nozzle petals) attached to a thrust reverser sleeve and separated by an elastomeric seal in accordance with one exemplary embodiment.
Figure 4:
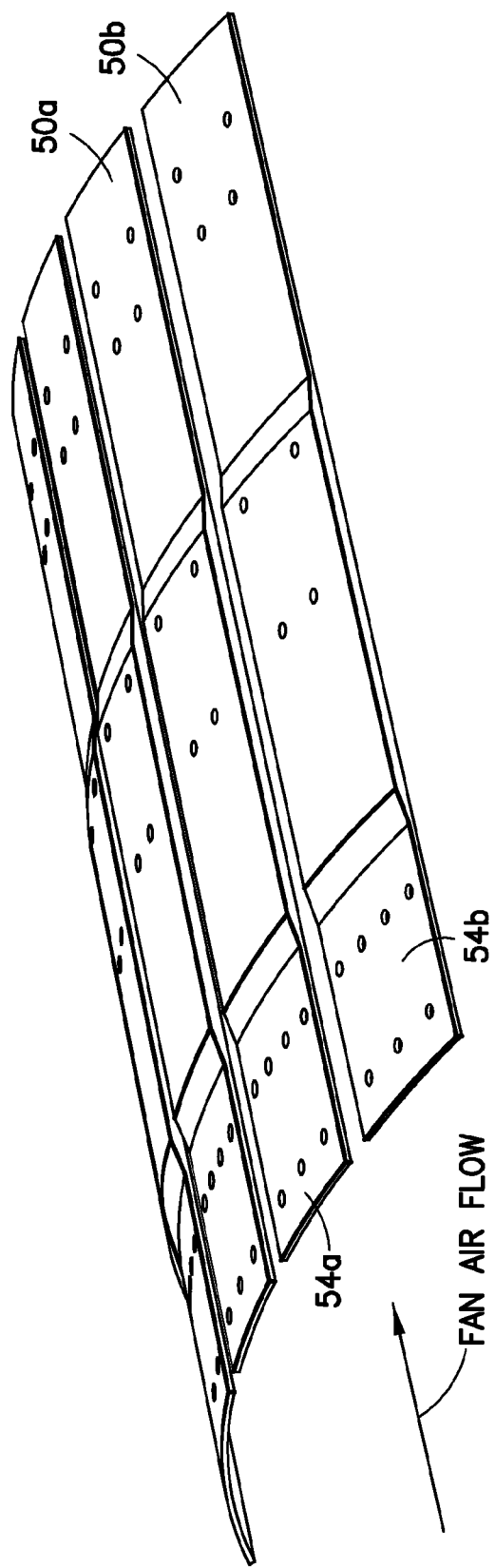
FIG. 4 is a diagram showing an isometric view of an array of petal inner (i.e., pressure side) face sheets, each inner face sheet being contoured for variable stiffness.

FIG. 3 shows two inner face sheets 50a and 50b (of adjacent petals) attached to a trailing lip area 38 of a thrust reverser sleeve and separated by an elastomeric seal 24 in accordance with one exemplary embodiment of the system generally depicted in FIG. 2. In this view, only the outer and end surfaces of the lip area 38 are visible. The outer surface of lip area 38 has a plurality of recesses for receiving the leading end portions of a plurality of outer face sheets (not shown). The outer face sheets corresponding to inner face sheets 50a, 50b would be installed by placing their leading end portions in recesses 52a and 52b respectively and then fastening them in place. These recesses are provided with holes 70 for receiving fasteners. The leading end portions of inner face sheets 50a and 50b are similarly installed in respective recesses formed on the inside of the lip area. Those leading end portions 54a and 54b of inner face sheets 50a and 50b are shown in FIG. 4, which also shows two additional inner face sheets (unnumbered). FIG. 4 shows inner face sheets 50a-50d in their undeflected positions when installed and with all other components of the installation deleted.

As shown in FIG. 4, the thickness (and thus the stiffness) of each inner face sheet varies along its length. Each inner face sheet is made of composite material (e.g., fiber-reinforced plastic material) formed to have a pre-stressed shape and contoured for variable stiffness along its length. The outer face sheets are fabricated from the same material and have similar stiffness properties. When coupled together, the inner and outer composite face sheets form flexible petals that deform in response to displacement of either or both cables. Flexible petals enable control of petal aerodynamic shape and control of fan nozzle throat location.

Figure 7:
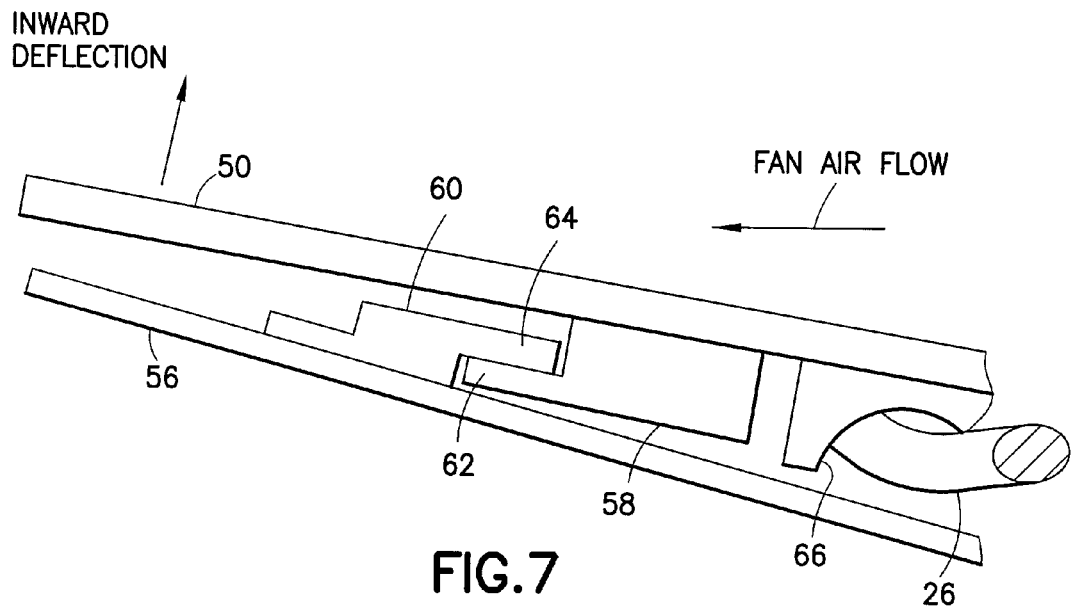
FIG. 7 is a diagram showing a side view of inner and outer petal face sheets coupled by a set of sliding brackets in accordance with one exemplary embodiment.

FIG. 7 shows a portion of an inner face sheet 50 coupled to a confronting portion of an outer face sheet 56 by means of a sliding bracket 58 attached to inner face sheet 50 and a Z-type sliding bracket 60 attached to outer face sheet 56. The brackets 58 and 60 slide relative to each other during petal deflection, but have respective projections 62 and 64 which stay interengaged to maintain face sheet coupling. As seen in FIG. 7, a cable 26 is slidably positioned in a cable guide 66 attached to the inner face sheet 50. The cable 26 deflects radially inward (which direction is up in FIG. 7) in response to both ends of the cable being moved further apart (by rotation of inner shafts 44 and 46 seen in FIG. 2), which displaces the inner face sheet 50 inward toward the engine axis. The interengagement of sliding brackets 58 and 60 causes the outer face sheet 56 to also be displaced inward toward the engine axis in tandem with the inner face sheet.

Referring again to FIG. 3, only the sliding brackets 58 and cable guides 66, 68 attached to inner face sheet 50a are shown. The other inner face sheet 50b will have identical hardware. Cable 26 slides along guide 66 during its displacement, whereas cable 28 slides along guide 68 during its displacement. The elastomeric seal is provided with respective passageways for cables 26 and 28 to pass through.

Figure 6:
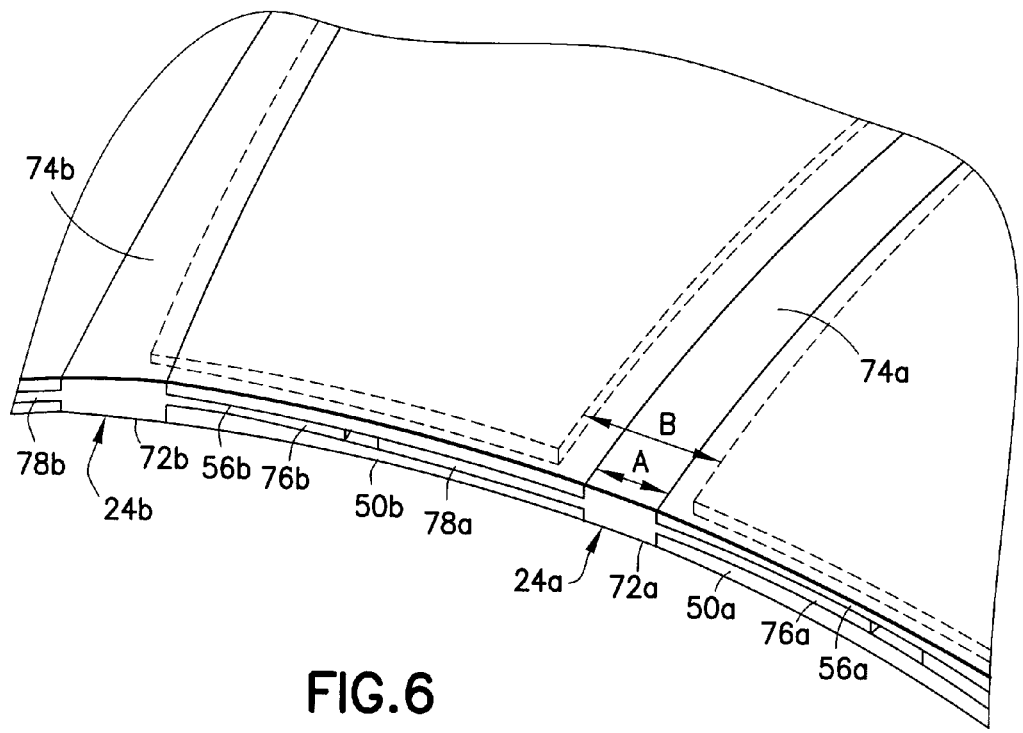
FIG. 6 is a diagram illustrating how outward deflection of two adjacent petals causes a clamped elastomeric seal to stretch in accordance with one exemplary embodiment.

The exemplary elastomeric seal 24 shown in FIG. 3 comprises an inner longitudinal rib 72 and an outer longitudinal rib 74. The inner longitudinal rib 72 projects into and occupies a gap formed by the space between adjacent inner face sheets 50a and 50b. The outer longitudinal rib 74 will projects into and occupy a gap formed by the space between the adjacent outer face sheets (not shown in FIG. 3) which will overlie inner face sheets 50a, 50b. The portions of seal 24 which extend transversely beyond the width of the longitudinal ribs 72 and 74 in both directions will be sandwiched between and clamped by the inner and outer face sheets of the two petals on respective sides of seal 24. In particular, seal 24 has a T-shaped trailing end comprising two transverse arms 76 and 78 which project into and occupy the space between the trailing tips of the inner and outer face sheets, as shown in FIG. 6 (discussed later). The transverse arms 76, 78 at the trailing edge provide additional clamping area in a section of the seal which stretches the most during outward petal deflection. The wider arms at the mid-span were designed to increase the seal resistance to twist, but can be eliminated if the elastomeric seal 24 shows little tendency to twist.

Figure 5:
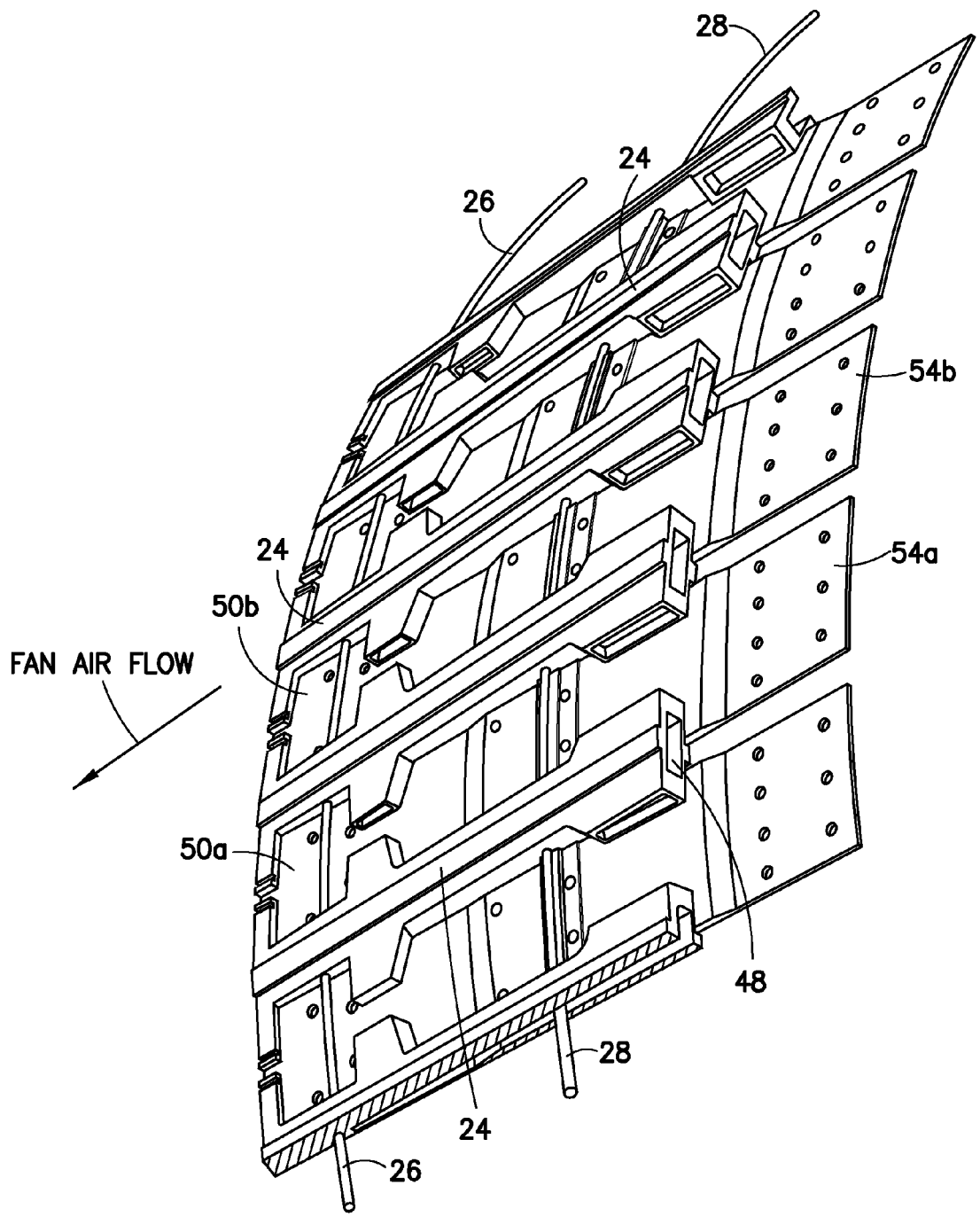
FIG. 5 is a diagram showing an isometric view of an array of inner face sheets having gaps closed by elastomeric seals configured in accordance with one exemplary embodiment thereof.

FIG. 5 shows an assembly comprising alternating inner face sheets (including inner face sheets 50a and 50b) and elastomeric seals 24. FIG. 5 provides a view from a vantage point located in front of the leading ends of the seals 24, whereas FIG. 3 is a view from a vantage point located behind the trailing end of the seal. As seen in FIG. 5, each seal 24 is hollow starting with an opening 48 at the leading end of the seal and extending longitudinally toward but stopping short of the passageway for cable 26. Hollow seals are used because they are more easily deformable and lighter than solid seals. At the location of cable 28, the seal is provided with two passageways on either side of and communicating with the central hollow space at that location. Cable 28 passes through those two passageways and the hollow space therebetween. The guides for guiding cable 26 during the latter's displacement are not shown FIG. 5 to reduce clutter in the drawings. Likewise, sliding brackets and outer face sheets are not shown in FIG. 5.

FIG. 6 is a diagram illustrating how outward deflection of two adjacent flexible petals causes a clamped elastomeric seal of the type shown in FIG. 3 to stretch in accordance with one exemplary embodiment. The solid lines show portions of three petals and two seals 24a, 24b in a state wherein the petals are in their under-area positions and the elastomeric seals 24a, 24b are in their nominal (unstretched) state. In this nominal state, upper longitudinal rib 74a of seal 24a projects into the gap between the adjacent outer face sheets 56a and 56b; lower longitudinal rib 72a of seal 24a projects into the gap between the adjacent inner face sheets 50a and 50b; transverse arm 76a of seal 24a extends between the trailing edges of face sheets 50a and 56a; and transverse arm 78a of seal 24a extends between the trailing edges of face sheets 50b and 56b. In this nominal state, the gap between the adjacent trailing edges of upper face sheets 56a and 56b has a width A. The seal 24b (comprising ribs 72b, 74b and arms 76b, 78b) is also in a nominal state.

The dashed lines seen in FIG. 6 show an increase in the width of the gap between the petal face sheets due to outward petal deflection, i.e., the petals are disposed at their over-area positions. These dashed lines are not intended to show the true deflected position relative to the undeflected position, but rather, the dashed lines indicating the relative positions of outwardly deflected face sheets have been superimposed on the undeflected face sheets to show the expansion in gap width when the petals are deflected from their under-area to their over-area positions. As seen in FIG. 6, the gap width is changed from A to B as a result of outward petal deflection, where B>A. In this circumstance, because the transverse arms 76a and 78a (as well as other parts of seal 24a not shown in FIG. 6) are clamped between the respective pairs of confronting inner and outer face sheets, this increase in gap width causes the extremely flexible elastomeric material of seal 24a to stretch in the width direction. Likewise seal 24b is stretched in the width direction.

In accordance with the particular embodiment shown in FIGS. 3-7, the as-manufactured shapes of the installed flexible petals are designed to produce the fan nozzle over-area when the petals are in their undeflected states. The multi-cable actuation system pulls the petals inwards to reduce the fan nozzle exit area. The stiffness of the flexible petals varies along its length, the variation being tailored to the axial spacing of the cables and tuned to deflect to a specific aerodynamic target profile during a specific flight segment. The elastomeric seals placed between adjacent petals provide means for independent relative axial motion as external and internal petal face sheets deflect about different axes. In addition, the elastomeric seals, together with the petals, provide a continuous flow surface and prevent air leaking from the fan pressure side of the fan nozzle to the ambient pressure side, thereby improving engine performance.

In accordance with alternative embodiments, the deflection of a variable area fan nozzle petal can be actuated using a single cable rather than two cables. In the embodiment depicted in FIG. 8, inward deflection of the petals 18 on each side of the engine is actuated by a system comprising respective cables 26 (only one cable is visible in FIG. 8) which is disposed generally circumferentially. As described above, each petal comprises overlapping inner and outer face sheets having a space therebetween, and the cable 26 shown in FIG. 8 passes between the inner and outer face sheets of the petals 18 and also passes through the elastomeric seals. However, to avoid undue complexity in this drawing, the cable 26 has been drawn as if fully visible from one end to the other, when in fact the major portion of this cable is covered by the outer sheets of the petals 18 and by the elastomeric seals 24.

Figure 8:
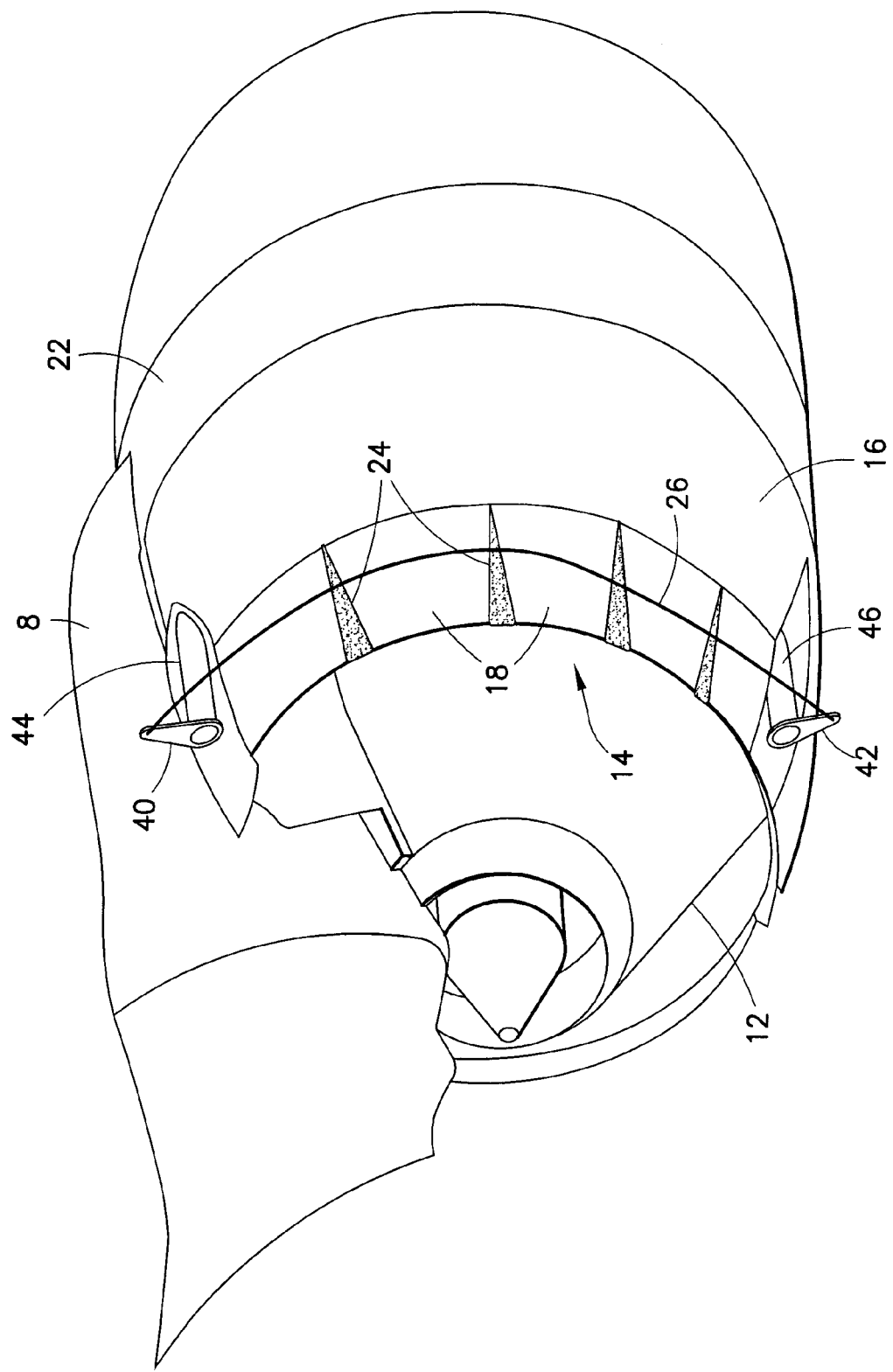
FIG. 8 is a diagram showing an isometric view of an aircraft turbofan engine having a cable-actuated variable area fan nozzle attached to a thrust reverser sleeve, the actuation system having a single cable.

Still referring to FIG. 8, the ends of cable 26 are attached to the ends of respective arms 40, 42, which are respectively mounted to shafts 44, 46. In this embodiment, the shafts are respectively located adjacent to the hinge and latch beams (not shown) that support the thrust reverser sleeve. The components of the actuation system which drives rotation of shafts 44, 46 will now be described with reference to FIGS. 9-11.

Figure 9:
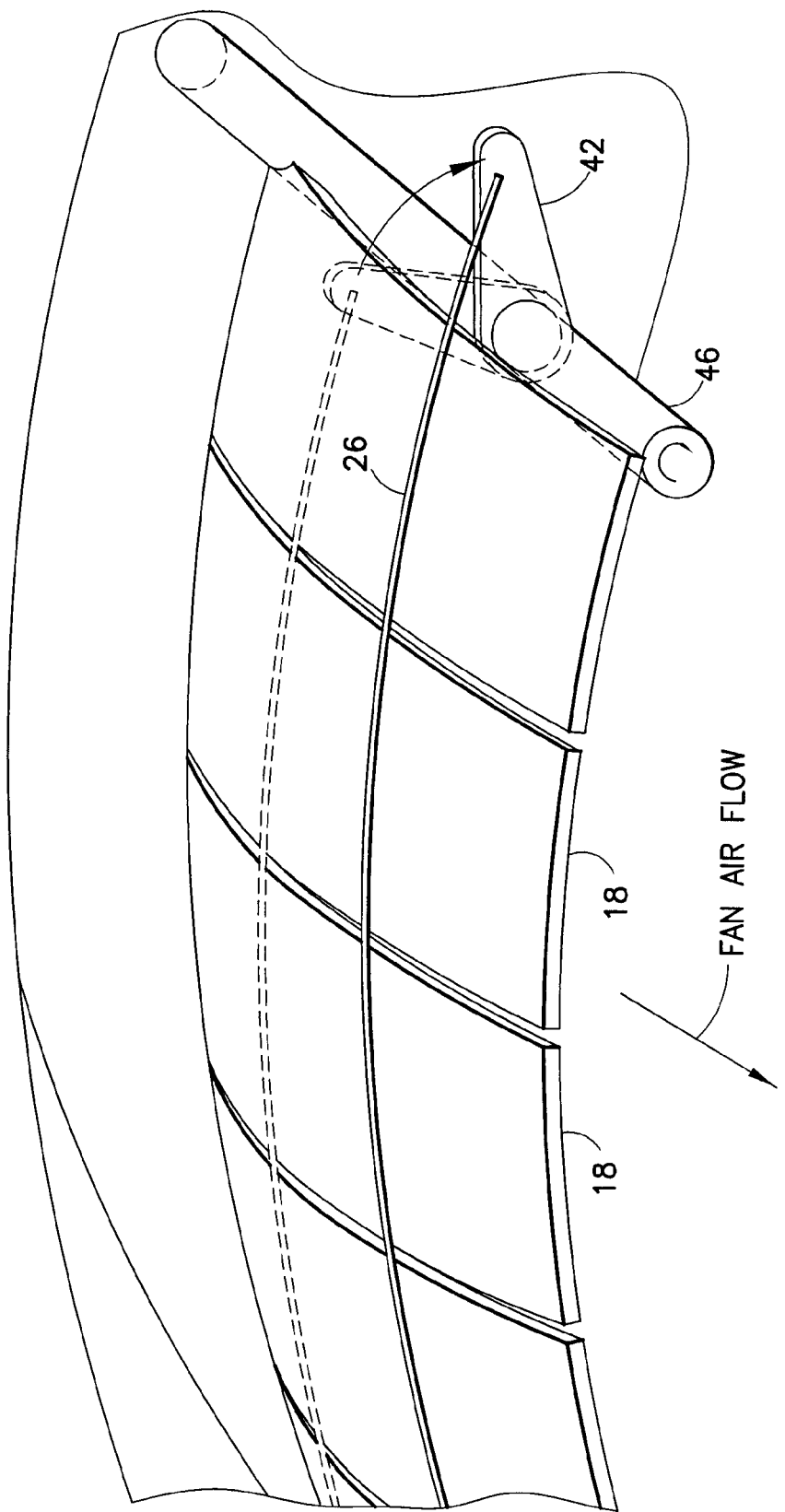
FIG. 9 is a diagram showing an isometric view of portions of an actuation system which uses a single cable (or composite tube) to deflect petals.

FIG. 9 is an isometric view of portions of an actuation system which uses a single cable to deflect petals 18 inward. The petals can be either flexible petals fastened to or rigid petals pivotably coupled to the lip area of a thrust reverser sleeve. One end of cable 26 is attached or fastened to one end of an arm 42 which is mounted to a rotatable shaft 46. The other end of cable 26 is also attached or fastened to an arm mounted on a shaft, as shown in FIG. 8 (see arm 40 and shaft 44). Shafts 44, 46 are driven to rotate in opposite directions by respective motors, which motors are preferably controlled by a single controller. This opposite shaft rotation causes the shaft-mounted arms 40, 42 to rotate in opposite directions. In cases where the command to the controller was to produce inward petal deflection, the rotation in opposite directions causes the distance between the respective ends of the arms to increase. The resulting generally radially inward displacement of cable 26 pulls the petals 18 radially inward. FIG. 9 shows the angular positions of arm 42 at the start and end of rotation that causes the petals to deflect inward, the positions of the arm 42 and cable 26 at the start being indicated by dashed lines and the arm and cable positions at the end of the rotation being indicated by solid lines. More specifically, the end of the cable 26 travels along an arc described by the point on arm 42 where the cable end is attached. The arc traveled by the other end of cable 26 is similar but opposite in direction.

The locations of the centers of rotations of arms 40, 42 (see FIG. 8) to which the cable ends are attached and the distance from the center of rotation to the point where the cable end is attached to the arm should be selected to ensure even (i.e., approximately equal) petal displacement at a specific flight segment or condition. In other words, the centers of rotation and lengths of the arms should be designed such that the end petals (i.e., the petals adjacent hinge and latch beams) deflect the same amount as petals in the middle of a half-cowl of a thrust reverser sleeve.

Each of the four shafts of the embodiment depicted in FIG. 8 (only two shafts are visible) is driven to rotate by a respective motor. The apparatus for rotatably supporting shaft 44 and driving its rotation will now be described with reference to FIG. 10. The apparatus described may be duplicated for the other shafts of the system for actuating inward petal deflection.

Figure 10:
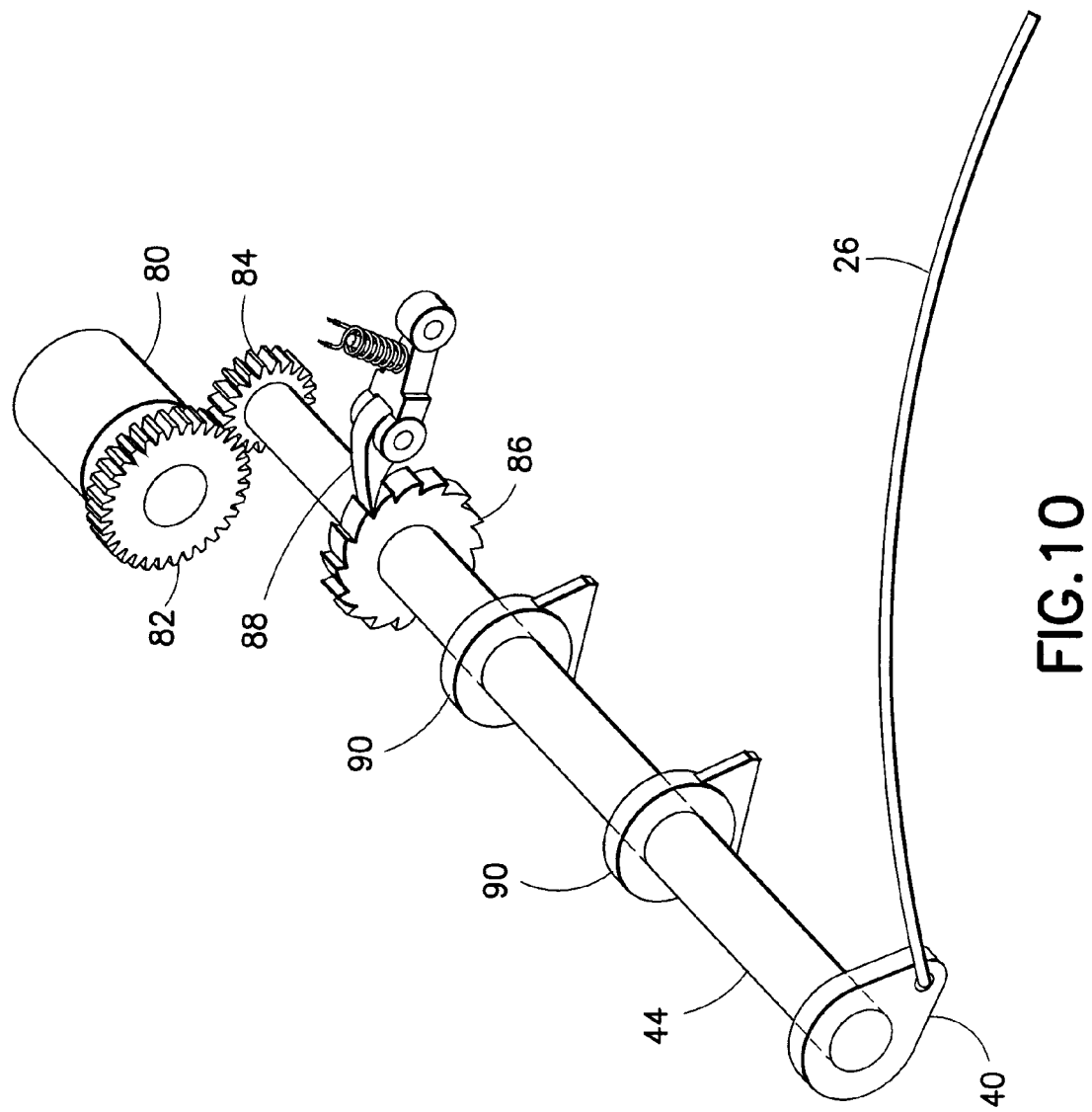
FIG. 10 is a diagram showing more components of the actuation system partly depicted in FIG. 9.

Referring to FIG. 10, arm 40 is shown mounted to one end of the shaft 44. Shaft 44 is coupled to an electric motor 80 by means of gear 82 mounted on the motor output shaft and gear 84 mounted to the other end of shaft 44. The shaft is rotatably supported by a plurality of bearings 90, only two of which are shown. A ratchet mechanism locks the cable/petals in place at specific flight segments. The ratchet mechanism comprises a ratchet wheel 86 affixed to the shaft 44 and a spring-controlled pawl 88 which acts as a pivoted catch that engages with the ratchet wheel to limit shaft rotation.

Figure 11:
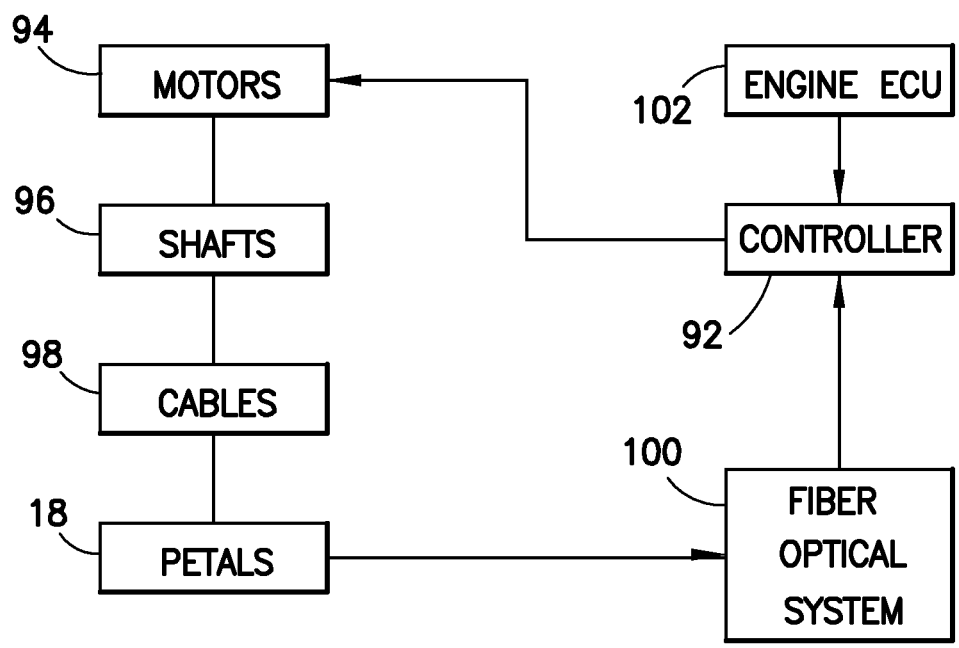
FIG. 11 is a block diagram showing the architecture of a system for controlling variable area fan nozzle petal deflection in accordance with one exemplary embodiment.

FIG. 11 shows the architecture of a system for controlling variable area fan nozzle petal deflection in accordance with one exemplary embodiment. A plurality of motors 94 are controlled by a controller 92. The controller 92 may be implemented as part of the aircraft system, a centralized aircraft processor, a subsystem computing module dedicated to controlling petal deflection, or the like. The motors 94 are coupled to respective rotary shafts 96, which are in turn coupled to the ends of one or more cables 98. Optionally, the deflection of the petals 18 can be measured by a monitoring system (e.g., a fiber optical system 100) that outputs data representing those measurements. The controller 92 receives inputs from an engine control unit (ECU) 102 and from the fiber optical system 100, and then continuously adjusts the degree of petal deflection via the actuation system, thereby adjusting the fan nozzle exit area, based on the petal positional information received.

The inner and outer petal face sheets can be made of fiber-reinforced plastic, e.g. fiberglass, or other suitable material. For example, the outer face sheets may comprise materials such as aluminum alloys, graphite composites, ceramic-metal composites and plastics; and the lower face sheets may comprise materials such as higher-temperature-resistant aluminum alloys, graphite composites, ceramic-metal composites and higher-temperature-resistant plastics.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

For example, although exemplary embodiments disclosed hereinabove employ cables, rods, tubes or bands made of composite material can be used in place of cables. In particular, the rod, band or tube could be made of fiberglass or other flexible fiber-reinforced plastic.

Furthermore, it is known to provide a turbofan aircraft engine having a one-piece thrust reverser sleeve instead of two half-cowls. For such a configuration, using one pair of cables would reduce stresses in the petals by recreating hoop strength lost due to the slotting of the fan nozzle.

As used in the claims, the term "sleeve" should not be construed to require a structure whose ends or lips extend 360 degrees and further should not be construed to exclude a structure consisting of two half-sleeves or half-cowls.

The invention claimed is:

1. An apparatus installed on an aircraft, comprising:
a sleeve or duct having a trailing lip area;
a plurality of petals arranged side by side with gaps between adjacent petals, one end of each petal being attached or pivotably coupled to said lip area;
a plurality of elastomeric seals configured and disposed to close said gaps between adjacent petals; and
an actuation system comprising a first flexible member, first and second motors, a first shaft driven by said first motor, a second shaft driven by said second motor, a first arm projecting transversely from said first shaft and comprising a distal end, and a second arm projecting transversely from said second shaft and comprising a distal end, wherein one end of said first flexible member is attached to said distal end of said first arm and another end of said first flexible member is attached to said distal end of said second arm, said first flexible member being movable to deflect said petals inward as said distal ends of said first and second arms move apart in response to rotation of said first and second shafts in opposite directions.

2. An apparatus installed on an aircraft, comprising:
a sleeve or duct having a trailing lip area;
a plurality of petals arranged side by side with gaps between adjacent petals, one end of each petal being attached or pivotably coupled to said lip area;
a plurality of elastomeric seals configured and disposed to close said gaps between adjacent petals, wherein at least one of said elastomeric seals comprises a first portion that moves with a portion of a first petal that is in contact with said first portion, a second portion that moves with a portion of a second petal that is in contact with said second portion, and a third portion which is stretched as said first and second petals move further apart from each other; and
an actuation system comprising a flexible member, a motor, a shaft driven by said motor, and an arm projecting from said shaft, wherein one end of said flexible member is attached to said arm, said flexible member being movable to deflect said petals inward in response to a rotation of said shaft,
wherein each of said first and second petals comprises respective inner and outer face sheets that confront each other with space therebetween, said flexible member passes through said spaces between confronting inner and outer face sheets, and said third portion of said one elastomeric seal projects into a space between and contacting opposing edges of the inner face sheets of said first and second petals.

3. An apparatus installed on an aircraft, comprising:
a sleeve or duct having a trailing lip area;
a plurality of petals arranged side by side with gaps between adjacent petals, one end of each petal being attached or pivotably coupled to said lip area, wherein each petal comprises respective inner and outer face sheets that confront each other with space therebetween; and
a plurality of elastomeric seals configured and disposed to close said gaps between adjacent petals,
wherein at least one of said plurality of elastomeric seals comprises a first portion that projects into a first space between opposing edges of the outer face sheets of adjacent first and second petals, a second portion that projects into a second space between opposing edges of the inner face sheets of said first and second petals, a third portion that projects into a third space between confronting portions of the inner and outer face sheets of said first petal, and a fourth portion that projects into a fourth space between confronting portions of the inner and outer face sheets of said second petal.

4. The apparatus as recited in claim 3, wherein said at least one elastomeric seal is hollow along a major portion of its length.

5. The apparatus as recited in claim 3, wherein said third portion of said at least one elastomeric seal is clamped by said confronting portions of the inner and outer face sheets of said first petal, and said fourth portion of said at least one elastomeric seal is clamped by said confronting portions of the inner and outer face sheets of said second petal.

6. The apparatus as recited in claim 5, wherein said at least one elastomeric seal is in a stretched state when said first and second petals are in respective first positions and is in a substantially unstretched state when said first and second petals are in respective second positions radially inward of said first positions.

7. The apparatus as recited in claim 3, further comprising a core nacelle having a core nozzle at one end, wherein said sleeve is a thrust reverser sleeve that surrounds at least a portion of said core nacelle.

8. An apparatus installed on an aircraft, comprising:
a sleeve or duct having a trailing lip area;
a plurality of petals arranged side by side with gaps between adjacent petals, one end of each petal being attached or pivotably coupled to said lip area, wherein each petal comprises respective inner and outer face sheets that confront each other with space therebetween;
a plurality of elastomeric seals configured and disposed to close said gaps between adjacent petals; and
an actuation system comprising a first flexible member that passes through said spaces between said inner and outer face sheets and is movable to deflect said petals inward, wherein said first flexible member comprises a cable, rod, tube or band that passes through openings formed in said elastomeric seals.

9. The apparatus as recited in claim 8, wherein said actuation system further comprises a motor, a shaft driven by said motor, and an arm projecting from said shaft, wherein one end of said first flexible member is attached to said arm.

10. The apparatus as recited in claim 9, wherein said actuation system further comprises a fiber optic sensing system arranged to detect petal positions and a controller connected to receive petal position data acquired by said fiber optic sensing system, said controller being programmed to control said motor as a function of said received petal position data.

11. An apparatus installed on an aircraft, comprising:
a sleeve or duct having a trailing lip area;
a plurality of petals arranged side by side with gaps between adjacent petals, one end of each petal being attached or pivotably coupled to said lip area, wherein each petal comprises respective inner and outer face sheets that confront each other with space therebetween;
a plurality of elastomeric seals configured and disposed to close said gaps between adjacent petals; and
an actuation system comprising a first flexible member that passes through said spaces between said inner and outer face sheets and is movable to deflect said petals inward, wherein each petal further comprises a first sliding bracket attached to said outer face sheet and a second sliding bracket attached to said inner face sheet, said first and second sliding brackets being slidably interengaged with each other.

12. The apparatus as recited in claim 8, wherein each petal further comprises a respective guide attached to said respective inner face sheet in an area not occupied by the elastomeric seals disposed in the gaps on respective sides of said petal.

13. The apparatus as recited in claim 8, wherein said actuation system further comprises a second flexible member that passes through spaces disposed between said confronting inner and outer face sheets, said first and second flexible member being axially spaced from each other.

14. The apparatus as recited in claim 13, wherein said actuation system further comprises first and second motors, first and second shafts driven by said first and second motors respectively, and first and second arms projecting from said first and second shafts respectively, wherein one end of said first flexible member is attached to said first arm and one end of said second flexible member is attached to said second arm, and said second shaft is hollow and a portion of said first shaft is disposed inside said hollow second shaft.

15. The apparatus as recited in claim 8, further comprising a core nacelle having a core nozzle at one end, wherein said sleeve is a thrust reverser sleeve that surrounds at least a portion of said core nacelle.

16. The apparatus as recited in claim 3, wherein said sleeve or duct comprises a pair of half-cowls.

17. The apparatus as recited in claim 8, wherein said sleeve or duct comprises a pair of half-cowls.

18. The apparatus as recited in claim 1, wherein first and second petals of said plurality of petals comprise respective inner and outer face sheets that confront each other with space therebetween, and said first flexible member passes through said spaces between confronting inner and outer face sheets.

19. The apparatus as recited in claim 1, wherein said actuation system further comprises a second flexible member, third and fourth motors' a third shaft driven by said third motor, a fourth shaft driven by said fourth motor, a third arm projecting transversely from said third shaft and comprising a distal end, and a fourth arm projecting transversely from said fourth shaft, wherein one end of said second flexible member is attached to said distal end of said third arm and another end of said second flexible member is attached to said distal end of said fourth arm, said second flexible member being movable to deflect said petals inward as said distal ends of said third and fourth arms move apart in response to rotation of said third and fourth shafts in opposite directions.

20. The apparatus as recited in claim 19, said second and fourth shafts are hollow and respective portions of said first and third shafts are disposed inside said hollow second and fourth shafts respectively.

* * * * *